United States Patent [19]

Bialek et al.

[11] Patent Number: 4,683,412
[45] Date of Patent: Jul. 28, 1987

[54] CURRENT SOURCE INVERTER MOTOR DRIVE ADAPTED FOR FULL CURRENT REGENERATIVE MODE OPERATION

[75] Inventors: Edward J. Bialek, Buffalo, N.Y.; Leslie B. Anticich, Baltimore, Md.

[73] Assignee: Westinghouse Electric Corp., Pittsburgh, Pa.

[21] Appl. No.: 800,253

[22] Filed: Nov. 21, 1985

[51] Int. Cl.$^4$ ............................................. H02P 3/18
[52] U.S. Cl. .................................... 318/798; 318/806; 318/762
[58] Field of Search ............... 318/805, 812, 798, 806, 318/757, 758, 759, 762

[56] References Cited

U.S. PATENT DOCUMENTS 3,500,158  3/1970  Landau et al. ...................... 318/805
4,599,549  7/1986  Mutoh et al. ........................ 318/798

Primary Examiner—David Smith, Jr.
Attorney, Agent, or Firm—C. M. Lorin

[57] ABSTRACT

A current source inverter operates in a full current regenerative mode without the use of a tachometer, rather a constant volts-per-hertz loop is used in a motor feedback loop to generate a torque signal determining the current reference in a DC link current control loop, and the DC link voltage is sensed to derive a signal in magnitude and sign to allow maximizing current control under torque limits established on the basis of such sensed DC link voltage.

4 Claims, 8 Drawing Figures

CURRENT SOURCE INVERTER MOTOR DRIVE ADAPTED FOR FULL CURRENT REGENERATIVE MODE OPERATION

BACKGROUND OF THE INVENTION

The invention relates to current-source inverter (CSI) induction motor drives, in general, and more particularly to control of such a motor drive for operation in the braking, or regenerative mode, as well as in the motoring mode.

It is known to operate a CSI motor drive in the braking, or regenerative mode, while measuring shaft speed in order to derive a slip signal which can be used to achieve full current regenerative mode operation. See for instance "Current-Source Converter for AC Motor Drives" by Kenneth P. Phillips on page 195 and FIG. 8 in Adjustable Speed AC Drive Systems/Bimal K. Bose IEEE Press 1981. The present invention allows such regenerative mode of operation without having to measure shaft speed.

It is known to transfer control to the regenerative mode without the use of a tachometer. The prior art methods, however, only allow the motor to regenerate at a current level which is roughly equal to the magnetization current of the motor. For full current regeneration, the prior art still required the use of a tachometer.

The object of the present invention is to achieve full current regeneration in a CSI motor drive without using a tachometer. Not only is a tachometer an additional cost, but a tachometer, that it be digital, or analog, would have to be interfaced through electronics for microcomputer control, which increases the cost and decreases reliability. The present invention leads to a simpler system design, in particular since only line current, motor voltage, and DC link voltage are sensed.

SUMMARY OF THE INVENTION

In a current source inverter motor drive control system, the present invention combines means for sensing the DC link voltage in magnitude and sign; and means responsive to the motor input voltage and to a reference speed signal for deriving a torque reference signal, such torque reference signal being modified in relation to a motoring function of said voltage for one sign thereof and in relation to a regenerating function of said voltage for the other sign thereof, the DC link current of said CSI motor drive being controlled in response to such modified torque reference signal, thereby to maximize DC link current in both motoring and regenerating modes.

DESCRIPTION OF THE PREFERRED EMBODIMENT

Figure 1:
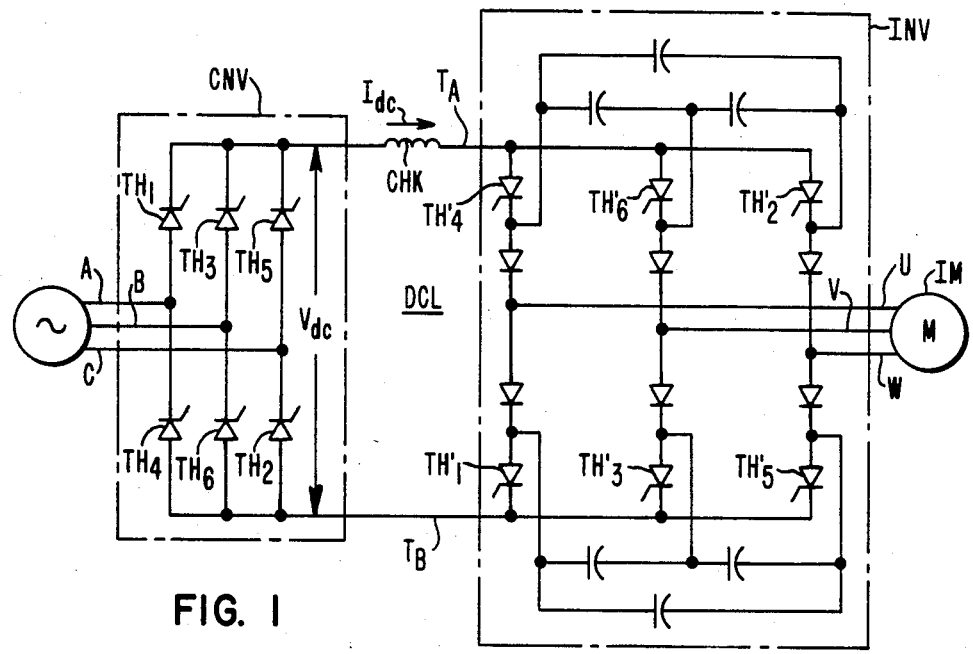
FIG. 1 shows the converter-DC link-inverter combination of a current source inverter (CSI) motor drive.

FIG. 1 shows a current-source inverter (CSI) motor drive including a three-phase AC power supply on phases A, B, C to six thyristors TH1–TH6 of a converter CNV controlled to generate a direct current $I_{dc}$ in a DC link DCL including positive and negative terminals, $T_A$, $T_B$ and a choke CHK, as generally known. An inverter, including thyristors TH'1–TH'6 on three poles connected to output phases U, V, W, is conventionally provided with interphase series networks of capacitors and diodes. The load is an induction motor IM supplied with AC current on phases U, V, W.

Figure 2:
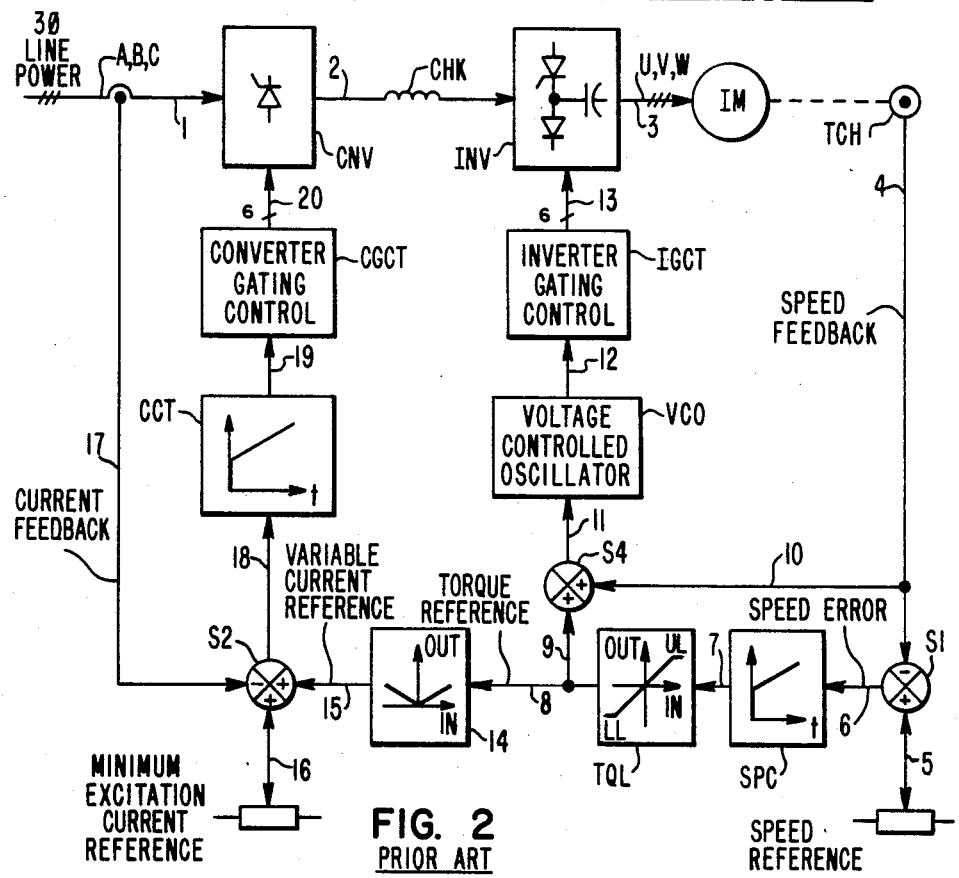
FIG. 2 shows a control system of the prior art associated with a CSI motor drive as in FIG. 1, in which operation in the regenerating mode makes use of a tachometer for the derivation of the slip as a control signal.

FIG. 2 shows the motor drive of FIG. 1 with a control system providing, by lines 13, gating of the inverter and, by line 20, gating of the converter. This is a prior art design including a tachometer TCH coupled on the shaft of the motor to derive a speed feedback signal on line 4. A speed reference signal, on line 5, is compared by summer S1 to the feedback signal of line 4 so as to derive a speed error on line 6. A speed controller (SPC) of proportional-plus-integral (PI) characteristic provides a speed control signal on line 7 in response to the error of line 6. A torque limit circuit TQL, having a linear characteristic across the origin between upper and lower limit, UL, LL (in the first and third quadrant, respectively), determines the torque signal during motoring and regenerative operation, depending upon whether the error of line 6 is positive, or negative, the speed controller output of line 7 being also positive or negative. Accordingly, the signal of line 8 will be effective for both motoring and braking via an absolute value circuit 14 to control the DC link current by generating on line 15 a current reference signal applied to a summer S2 while a current feedback (derived at the input of the converter by sensing the phase lines A, B, C of line 1) is being also inputted by line 17 into summer S2. Summer S2 is also responsive to a minimum excitation current reference on line 16, as generally known. On the other hand, the speed feedback signal of line 4 is derived on line 10 and added by a summer S4 with the torque reference signal of line 8, applied thereto on line 9.

As well known, the speed error of line 6 is converted into a torque reference signal on line 8, thereby generating on line 15 a variable current reference signal which causes an error signal on line 18 causing the DC link current $I_{dc}$ to increase, or decrease, accordingly. To this effect, the signal of line 18 is inputted into a PI current controller CCT which generates on line 19 a gating command signal for a gating controller circuit CGCT supplying to thyristors TH1–TH6 thereof pulses as required to control the DC link current $I_{dc}$. A general description of a CSI motor drive can be found, typically, in IEEE Transactions, Vol. IA-16, pp. 193–202, Mar/April 1980/L. Walker.

Figure 3:
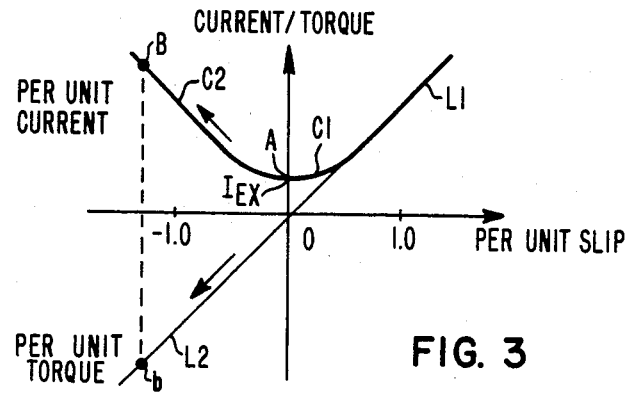
FIG. 3 is a graphic representation relating DC link current to torque as a function of the slip, provided to illustrate a strong divergence between torque and DC link current in the regenerating mode.

Referring to FIG. 3, the torque, current and slip per unit relationship of an induction motor supplied from a fixed voltage is illustrated by curves (L1, L2) for the torque per unit, and (C1, C2) for the current per unit. As indicated by operative point A, the motor requires a minimum value of the current excitation in order to maintain synchronous speed with zero-load torque (0 on curves L1, L2). This is achieved by the current loop (line 15, summer S2 and line 18) and by the speed loop (lines 9 and 10, summer S4 and line 11) of FIG. 2. The absolute value circuit 14 provides a correct interaction between the two loops independently of the direction of rotation on lines 8 and 10. Accordingly, at operative point A, the excitation is maintained so as to excite the induction motor field at approximately rated flux. Since there should be zero speed error, the inverter is gated at a frequency equivalent to motor speed. If the speed reference of line 5 is quickly ramped toward zero, a negative speed error will appear on line 6. The PI speed controller SPC integrates this error negatively, thereby reducing the inverter frequency reference by line 11, and increasing the torque reference negatively on line 8. The absolute value of the torque reference is the variable current reference of line 15. Therefore, the current in the DC link increases and provides a negative torque. The current and torque levels of curves C2 and L2 eventually stabilize when point B is reached as the motor decelerates and the speed error approaches zero. Nevertheless, a torque limit (UL and LL) is provided in order to protect the motor and power conversion equipment against excessive torque, or DC current, in the process.

With the approach of FIG. 2, a tachometer increases the cost, and electronics required to interface with the digital side in digital control, are also a cost and can decrease reliability.

Figure 4:
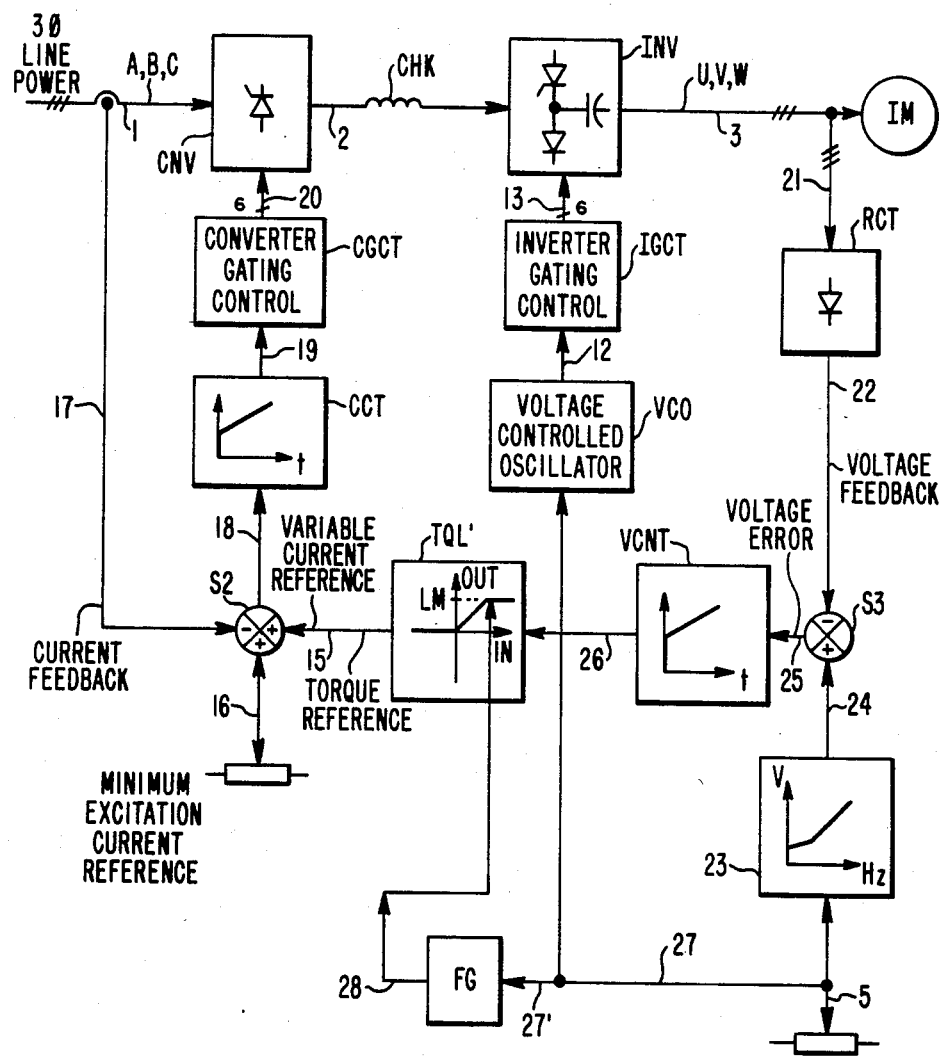
FIG. 4 illustrates in block diagram torque limitation in a control system at constant volts-per-hertz in the prior art, when regeneration is performed without a tachometer.

FIG. 4 is a prior art control system which does not require a tachometer. With this approach, instead of using a slip frequency signal to generate a current reference for the motor, the motor terminal voltage is sensed and used in a loop to regulate the voltage of the motor so as to keep the motor at constant volts-per-hertz. Voltage sensed on line 3 for phases U, V, W is rectified at RCT, and a voltage feedback on line 22 is compared by a summer S3 with the constant volts-per-hertz signal of line 24 derived from a function generator 23 converting the speed reference signal of line 5. From line 5, via line 27, the speed reference signal goes to a voltage-controlled oscillator VCO which, by line 12, commands the inverter gating controller IGCT. The latter applies pulses by lines 13 to the thyristors of the inverter INV.

From summer S3 is derived a voltage error signal which a PI voltage controller VCNT transforms into an active control signal, on line 26, for the torque limiter circuit TQL'. In contrast to the torque limiter circuit TQL of FIG. 2, which included functions for both the motoring and the braking quadrant, torque limiter circuit TQL' applies only to the motoring quadrant. The speed reference signal of lines 5 and 27 is applied by line 27' to a function generator FG establishing a limit signal as a function of speed for the torque limiter circuit TQL'. Thus, on the linear response to the signal of line 26, function generator FG applies a limit LM by line 28 to TQL'. FIG. 4 is otherwise the same as FIG. 2. From line 15 the variale current reference signal outputted by TQL' enters the current loop.

The control system of FIG. 4 is simpler and more reliable than the control system of FIG. 2 because a tachometer is not required. Motor terminal voltage is fed back to the voltage controller, while constant volts-per-hertz are maintained, thereby to ensure constant flux. Therefore, maximum torque capability is achieved with the motor.

However, with this system, whether the motor drive is operating in the regenerative mode is not ascertained since the control system of FIG. 4 does not generate a speed error, or effect a slip calculation. Besides, the "torque reference" of line 15 is not an exact representation of the motor torque. Therefore, as shown by limiter circuit TQL', negative torque references are not allowed. However, as shown at point A of FIG. 3, a minimum excitation current level is maintained if the voltage controller outputs a negative signal. Thus, if the speed/voltage reference is being ramped quickly toward zero, resulting in a negative voltage error, and controller VCNT is negatively integrating, the variable current reference becomes clamped at zero. The motor drive can only provide a regenerating torque level which is commensurate with the low level allowed by the minimum excitation current.

Figure 5:
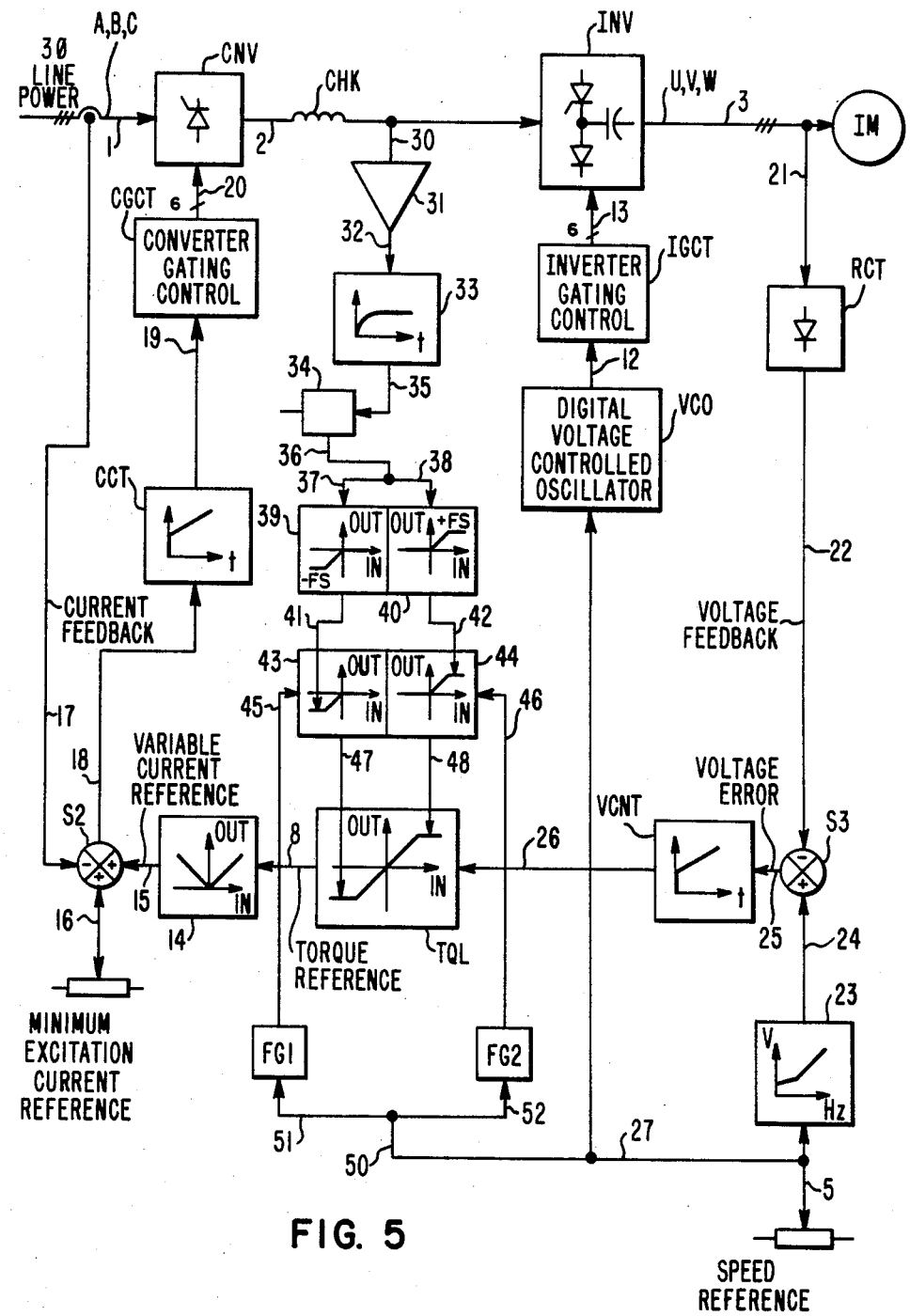
FIG. 5 is a control system for a CSI motor drive embodying the present invention, namely providing full regenerative current without the use of a tachometer, thus, being an improvement over the control systems of FIG. 2 and FIG. 4.

Referring to FIG. 5, the control system according to the invention is illustrated by the preferred embodiment. The torque limit circuit TQL' is now replaced by a torque limit circuit TQL like in FIG. 2 and such TQL circuit applies its torque reference signal to an absolute value circuit 14 like in FIG. 2. This has been made possible by a DC link voltage feedback loop responsive to the sign of such voltage, depending upon whether the motor is motoring, or regenerating. Thus, without using a tachometer, a solution equivalent to the speed reference loop of FIG. 2 has been incorporated into a voltage feedback control system like FIG. 4.

The DC link voltage is sensed in the DC link, thus, between the terminals $T_A$, $T_B$ of FIG. 1, and derived on line 30. This is done by a resistor attenuator circuit and decoupling is provided from the power line 2 by a differential operational amplifier 31. The feedback DC volts signal so outputted on line 32 is inputted into an A/D converter for digital control. At 33 is provided a digital low-pass filter (DCLVFILT) and at 34 gain adjustment (TLIMDCLV) is provided. Then, follows by line 36 the determination of positive, or negative, torque limits, depending upon whether the DC voltage is positive or negative; by line 37 to block 39 if the motor is braking, by line 38 to block 40 if the motor is motoring. To this effect, function generators 39 and 40 introduce a lower and an upper limit, respectively, to the signal TLIMDCLV of line, 37, or 38 (the other line 38 or 37, being clamped to zero by the corresponding block 39 or 40). Such signal outputted, by block 39 on line 41, by block 40 on line 42, is converted into a torque representative signal treated as a function of speed by respective function generators 43 and 44, also introducing a limit (lower for 43, upper for 44). To this effect, the signal of lines 5 and 27, which represents the speed reference, is passed by respective lines 51, 52 to function generators FG1 and FG2 providing on respective lines 45, 46 inputs to blocks 44 and 43, respectively. Depending upon the magnitude of such an input, the limit imposed from line 41, or 42, will be higher, or lower. The signals so outputted on lines 47, 48, respectively, are the torque signals for the regenerating and motoring modes applied to the torque limit circuit TQL, effective upon one, or the other quadrant, and introducing a torque limit TLIMNEG by line 47 (negative side), TLIMPOS by line 48 (positive side).

If the drive is motoring, line 38 is effective (positive voltage in the DC link), and on the opposite side of the loop, TLIMNEG is clamped to zero (block 43). TLIMPOS is a positive number initially determined by the pre-programmed torque-speed function generator FG2 set up so as to satisfy the requirements of the particular motor drive. Such number is, then, limited below positive values of TLIMDCLV which is proportional to the derived DC link voltage. The operation of the drive is equivalent to the one in FIG. 4, where the torque is limited between zero and a calculated positive maximum depending upon speed reference and DC link voltage.

If the drive tends to become regenerating (DC link voltage negative), TLIMPOS becomes clamped to zero (line 38 and block 44), whereas TLIMNEG is released (line 37 and block 43). TLIMNEG is a negative number initially determined by a pre-programmed torque-speed function generator FG1 set up to satisfy the requirements of the drive under regenerating conditions. The number is then limited to be lower in magnitude than the negative values of TLIMDCLV which is proportional to the DC link voltage.

Thus, in conjunction with the absolute value function of block 14, the DC link current is allowed to increase during regeneration, as shown in FIG. 3, thereby providing full decelerating torque. The torque is limited between zero and a calculated negative maximum dependent upon speed and the DC link voltage.

The primary reason for making the torque limit proportional to the DC link voltage is to prevent the current reference from jumping to a maximum as soon as the drive goes from motoring to regenerating, thereby overcoming "chattering" of the drive between maximum motoring and maximum regenerating torque limits. Thus, the invention uses the DC link voltage, as sensed and low-pass filtered, to obtain an average level which is, then, scaled appropriately. The signal so derived is then used to adjust the limit of the current reference. The effect of such control is to set the correct current limit, depending upon the polarity and level of the DC link voltage.

The algorithm used to perform the operation illustrated in FIG. 5 by the DC link feedback loop from line 30 to lines 47 and 48 is performed by an Intel 8086 microprocessor and software is written in PLM-86 and ASM-86 as described in the IAPX 86, 8086 User's Manual of Intel Corporation, July, 1981.

Figures 6A, 6B:
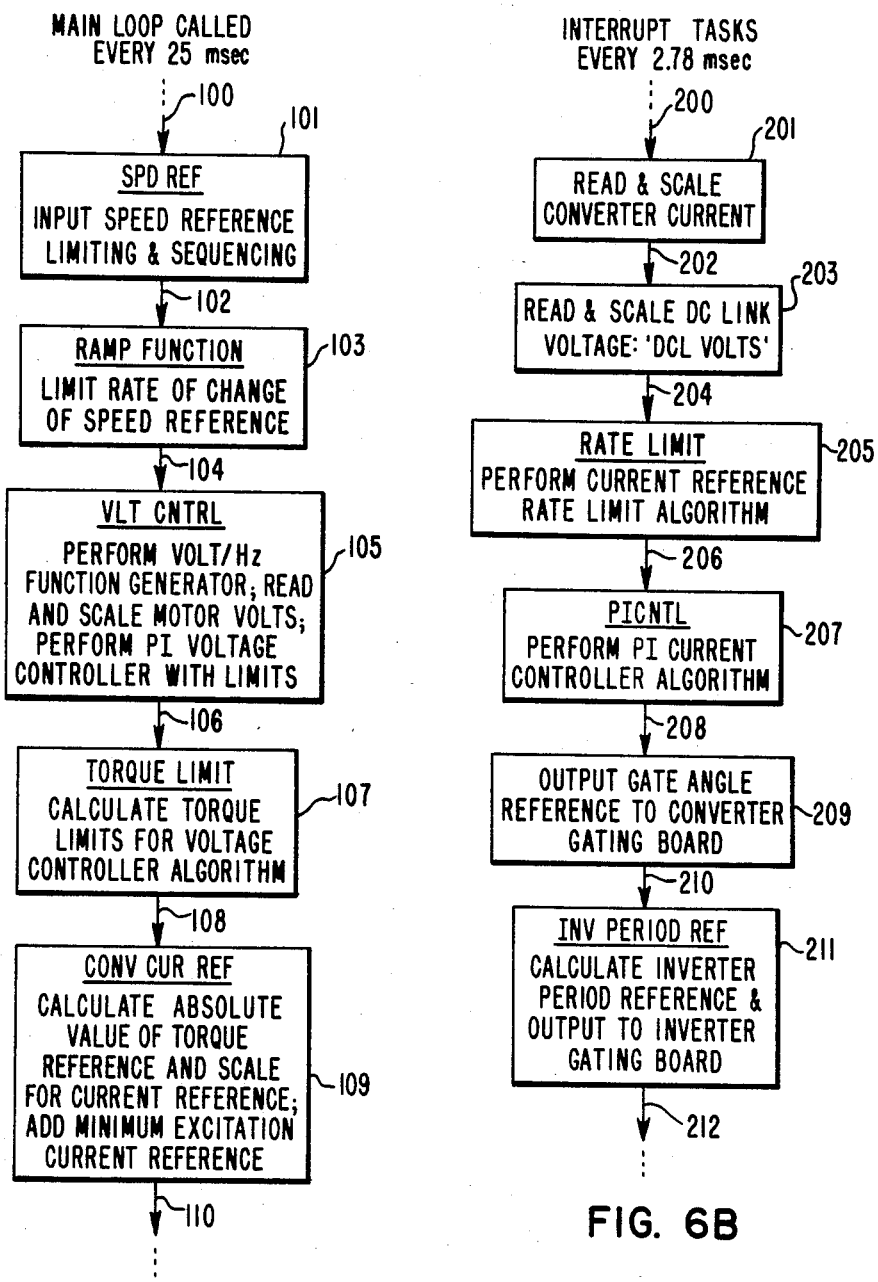
FIGS. 6A–6C are flow charts showing the digital implementation of the control system according to the invention.
Figure 6C:
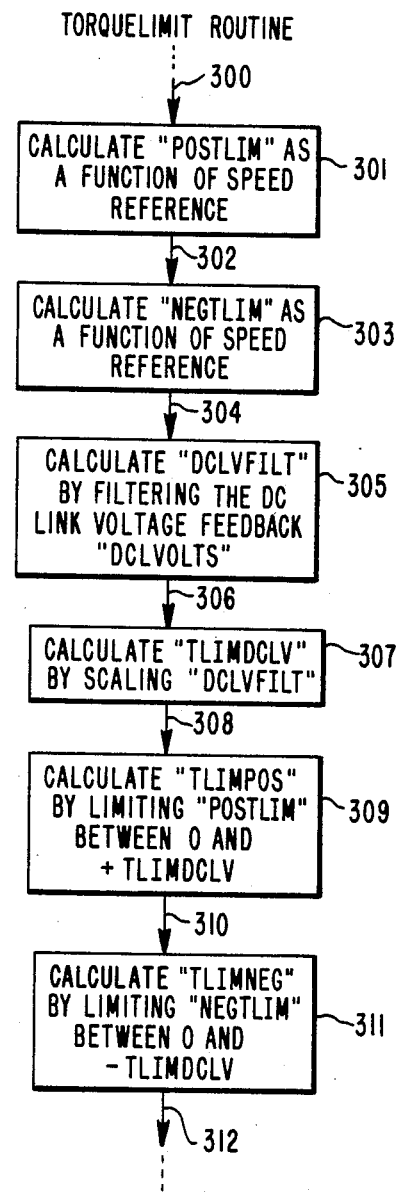

Digital implementation of the invention is illustrated by the flow charts of FIGS. 6A, 6B and 6C. FIG. 6A relates to the main loop via lines 25, 26, 8 and 15. Every 25 milliseconds the system by line 100 goes to block 101 at which stage the input speed reference limiting and sequencing functions are performed. Then, by line 102 it goes to block 103, establishing a ramp function to limit the rate of change of the speed reference. Thus, the signal of line 5 of FIG. 5 has been determined and, by line 104, the system goes to block 105 which corresponds to block 23 of FIG. 5. The volts-per-hertz function of function generator 23 is performed at 105. The motor voltage, as sensed and derived on line 21, is read and scaled. The function of PI voltage controller VCNT is performed according to its limits. From block 105, via line 106, the system goes to block 107 where the torque limit circuit TQL of FIG. 5 is exercised. This means calculating the torque and the limits of lines 47 and 48 by the controller algorithm, (from line 312) in accordance with FIG. 6C, as explained hereinafter. From block 107, via line 108, the system goes to block 109 which involves the loop to the converter gating controller CGCT. First, the absolute value of the torque reference is calculated and scaled to provide, on line 15 of FIG. 5, the current reference, and the minimum excitation from line 16 is added.

Referring to FIG. 6B, every 2.78 milliseconds interrupt tasks are performed in sequence, as shown starting on line 200. At 201 the converter current is read and scaled. At 203 the DC link voltage is read and scaled to provide the DCL volts signal of line 32. At 205 the rate limit algorithm is performed. At 207 the PI current controller CCT algorithm (PICNTL) is exercised involving lines 18 and 19. At 209 the output gate angle reference, of line 19 in FIG. 5, is determined for gating the converter, and the value is applied to the converter gating board. Finally, at 211 the control of the inverter is performed (an operation involving line 27), thus, determining the period of the inverter. The period reference of the inverter is calculated and outputted to the inverter gating board. Blocks 201 to 211 are related by connecting lines 202-210, respectively.

FIG. 6C relates more specifically to the DC link voltage feedback loop according to the invention. The torque limit routine called for by block 107 of FIG. 6A is started at 300. At block 301, POSTLIM is calculated as a function of speed reference (involving function generator FG2). Then, by line 302 the system goes to block 303 for which NEGTLIM is calculated as a function of speed reference (involving function generator FG1). By line 304 the system goes to block 305 where DCLVFILT of line 35 is calculated by filtering at 33 the DC link voltage feedback DCLVOLTS of line 32. Thereafter, by line 306, at block 307, TLIMDCLV is calculated by scaling DCLVFILT, as at 34 and 36 in FIG. 5. By line 308 the system goes to block 309 where TLIMPOS is calculated by limiting POSTLIM between 0 and an upper limit+TLIMDCLV, and to block 311 where TLIMNEG is calculated by limiting NEGTLIM between 0 and −TLIMDCLV. The routine goes out by line 312.

To summarize:

The DC link voltage measured by an A/D converter is filtered and scaled in software. This signal is then used in two locations. In the generation of TLIMPOS the signal is limited between 0 and positive full scale. For TLIMNEG the signal is limited between 0 and negative full scale. These signals are then used to limit the additional current required by the voltage controller to a value related to the DC link voltage. This additional current reference is added to the minimum current reference to generate the total current reference for the drive. In effect, this control limits the current to an acceptable level when the motor is in transition between motoring and generating.

. The use of the method according to the invention eliminates the need for a tachometer in a motor drive used for flow control and other similar applications, i.e., where full regenerative capability is desired and where accurate speed measurement is not required. Sensing of the DC link voltage can be done with components already available on the motor drive. This eliminates the reliability problems and costs associated with the use of a tachometer.

For the purpose of disclosing the prior techniques of current source inverter (CSI) motor drive control, Section 4 and pages 193 to 272 of "Adjustable Speed AC Drive Systems" by Bimal K. Bose edited by IEEE Press 1981 are hereby incorporated by reference.

We claim:

1. In a current source inverter (CSI) motor drive control system including: an AC/DC converter and an inverter coupled thereto through a DC link for supplying excitation to an induction motor; means operative at constant volts-per-hertz for deriving a voltage error in relation to the motor voltage and a speed reference signal; and a PI controller means responsive to said voltage error for generating a torque representative signal;

said inverter being controlled in relation to said speed reference signal; and said converter being controlled in relation to a current reference signal to vary the DC link current in accordance with said current reference signal;

the combination of:

means for deriving a signal representative of the DC voltage of said DC link in sign and magnitude;

means responsive to the magnitude of said DC voltage representative signal for generating in response to said torque representative signal a torque reference signal in accordance with the sign of said DC voltage representative signal; and absolute value function generator means responsive to said torque reference signal for generating said current reference signal.

2. The CSI motor drive of claim 1 with DC voltage representative signal deriving means including means for establishing a torque limit for a positive DC voltage sensed and a torque limit for a negative DC voltage sensed;

said PI controller means establishing a minimum speed reference signal when the motor is decelerating toward zero speed; and said negative torque limit being applied when said DC link voltage tends to exceed a predetermined magnitude.

3. The CSI motor drive of claim 2 with computer means responsive to said DC voltage representative signal for calculating one of said positive and negative torque limits in accordance with the sign of said DC voltage representative signal and the magnitude thereof.

4. The CSI motor drive of claim 3 with said current reference signal being a combination of a minimum current reference and an additional current reference limited between zero and a limit, such limit being the calculated torque limit derived by said computer means for one of said positive and negative signs.

* * * * *